US010621262B2

(12) United States Patent
Lemp et al.

(10) Patent No.: US 10,621,262 B2
(45) Date of Patent: Apr. 14, 2020

(54) CONFIGURABLE FEED FOR DISPLAY WITH A WEB PAGE

(71) Applicant: RevContent, LLC., Sarasota, FL (US)

(72) Inventors: John D. Lemp, Sarasota, FL (US); Christopher P. Maynard, North Port, FL (US); Harsh Jain, Los Altos Hills, CA (US)

(73) Assignee: REVCONTENT, LLC, Sarasota, FL (US)

( * ) Notice: Subject to any disclaimer, the term of this patent is extended or adjusted under 35 U.S.C. 154(b) by 162 days.

(21) Appl. No.: 15/907,587

(22) Filed: Feb. 28, 2018

(65) Prior Publication Data

US 2019/0129967 A1   May 2, 2019

Related U.S. Application Data

(60) Provisional application No. 62/586,104, filed on Nov. 14, 2017, provisional application No. 62/578,987, filed on Oct. 30, 2017.

(51) Int. Cl.
*G06F 16/958* (2019.01)
*H04L 29/08* (2006.01)
*H04L 12/58* (2006.01)
*G06F 16/955* (2019.01)
(Continued)

(52) U.S. Cl.
CPC ........ *G06F 16/958* (2019.01); *G06F 16/9566* (2019.01); *H04L 51/32* (2013.01); *H04L 67/02* (2013.01); *H04L 67/025* (2013.01); *H04L 67/20* (2013.01); *H04L 67/26* (2013.01);
(Continued)

(58) Field of Classification Search
CPC .......................... G06F 16/958; G06F 16/9577
See application file for complete search history.

(56) References Cited

U.S. PATENT DOCUMENTS

| 8,527,881 | B2* | 9/2013 | Selig ...................... G06F 17/243 |
| | | | 715/738 |
| 9,830,062 | B2* | 11/2017 | Zhang ...................... G06F 3/048 |
| 2008/0010319 | A1* | 1/2008 | Vonarburg .............. H04L 67/36 |

(Continued)

OTHER PUBLICATIONS

Joomla Blogs, News and Extensions, Mar. 17, 2016, pp. 1-20 https://stackideas.com/blog/new-joomla-comment-extension-komento.*

*Primary Examiner* — Scott T Baderman
*Assistant Examiner* — Mario M Velez-Lopez
(74) *Attorney, Agent, or Firm* — Muir Patent Law, PLLC

(57) ABSTRACT

A method of retrieving and displaying relevant content as part of a configurable feed in association with a web page hosted at a host server associated with a publisher includes: selecting a plurality of different content extensions having different content extension types to be displayed in association with the web page, wherein the web page is located at a particular URL; analyzing the web page for content to determine information about the web page; receiving a request for the URL of the web page; and based on the request and the analysis, selecting a plurality of content extension content corresponding respectively to the plurality of different content extensions and for display in a browser with the web page. The selection of the plurality of different content extensions may be made at least in part by the publisher, and the selection of the content extension content may be made at least in part by a third party content feed entity different from the publisher.

27 Claims, 4 Drawing Sheets

(51) Int. Cl.
*G06Q 50/00* (2012.01)
*G06Q 30/02* (2012.01)

(52) U.S. Cl.
CPC ....... *H04L 67/306* (2013.01); *G06Q 30/0277* (2013.01); *G06Q 50/01* (2013.01)

(56) References Cited

U.S. PATENT DOCUMENTS

| | | | | |
|---|---|---|---|---|
| 2009/0106103 A1* | 4/2009 | Milana | ................... | G06Q 30/02 705/14.41 |
| 2011/0271184 A1* | 11/2011 | SiMa | ....................... | G06F 9/451 715/705 |
| 2013/0019202 A1* | 1/2013 | Regan | ................. | G06F 16/9535 715/810 |
| 2015/0095475 A1* | 4/2015 | Dabbiru | ................ | H04L 67/325 709/223 |
| 2015/0234930 A1* | 8/2015 | Lakkur | ................... | G06F 3/048 715/240 |
| 2016/0034946 A1* | 2/2016 | Agarwal | ................ | G06Q 30/08 705/14.43 |
| 2016/0142382 A1* | 5/2016 | Ziebell | ................ | H04L 63/0428 713/168 |

\* cited by examiner

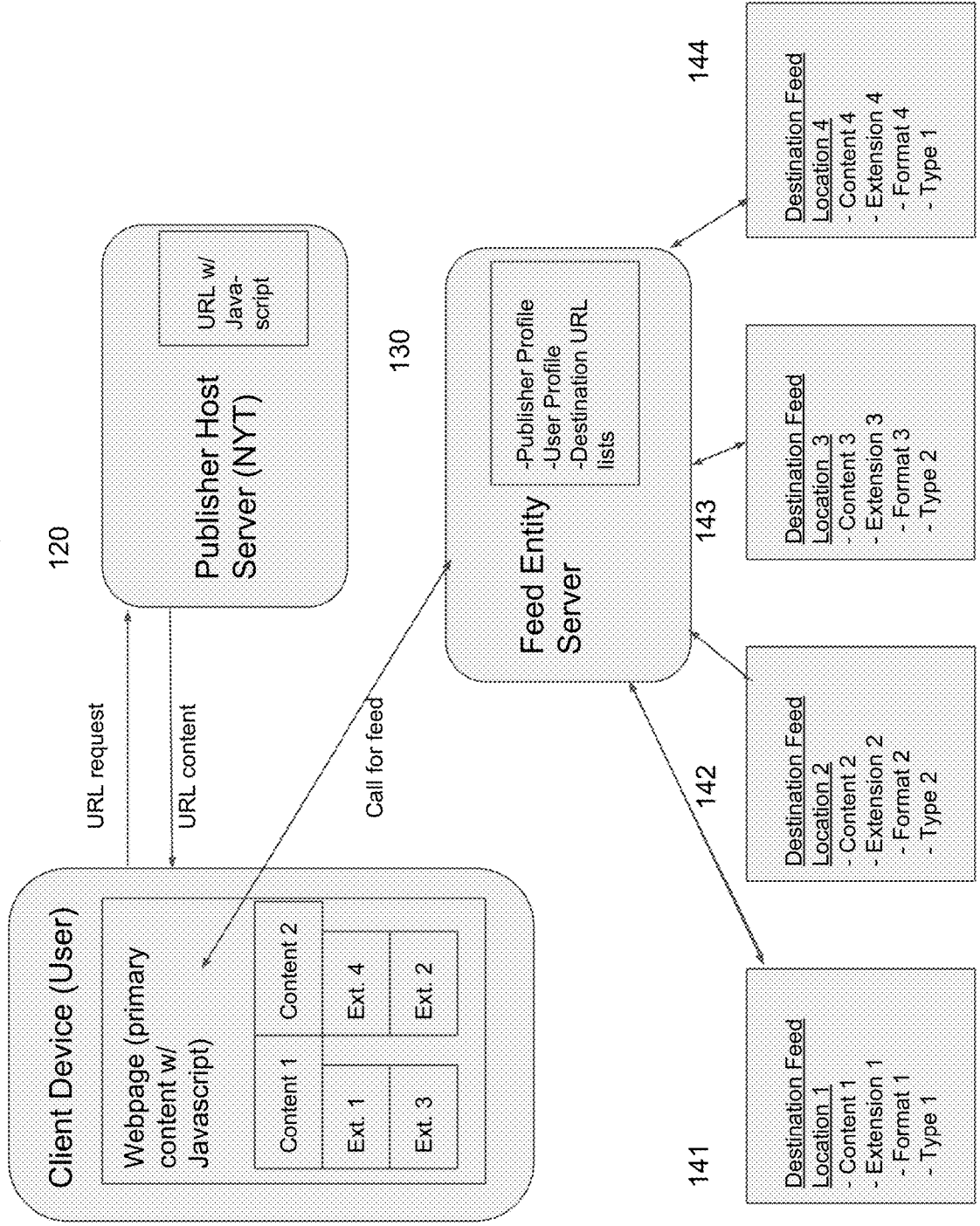

FIG. 2A

Publisher Profile - Table 1

| Publisher | Destination URLs for Feed | Content Extension Type |
|---|---|---|
| Newsweek.com | abc.com | comments |
| Newsweek.com | abc.com | reactions |
| Newsweek.com | def.com | comments |
| Newsweek.com | def.com | reactions |
| Newsweek.com | xyz.com | all found |
| Newsweek.com | jkl.com | all found |

FIG. 2B

Publisher Profile - Table 2

| Publisher | Content Type | Content Extension Type |
|---|---|---|
| Newsweek.com | video | all found |
| Newsweek.com | article | comments |
| Newsweek.com | article | reactions |
| Newsweek.com | article | shares |
| Newsweek.com | quiz | comments |
| Newsweek.com | quiz | reactions |

CONFIGURABLE FEED FOR DISPLAY WITH A WEB PAGE

CROSS-REFERENCE TO RELATED APPLICATIONS

This application claims the benefit of priority under 35 U.S.C. 119(e) to U.S. Provisional Patent Application No. 62/586,104, filed on Nov. 14, 2017, and to U.S. Provisional Patent Application No. 62/578,987, filed on Oct. 30, 2017, the contents of each of which are incorporated by reference herein in their entirety.

BACKGROUND

The present disclosure is directed toward a system and method for delivering relevant content to users in an online environment.

Many online publishers use services provided by third party content feed companies, to display a list of links, often in the form of images, at the bottom of the publishers' articles. These feeds typically include links to other websites or articles that are believed to be of interest to the reader, and may include links to additional articles or web pages of the publisher itself. In addition, many online publishers offer, as part of their own websites, content, as well as content extensions which include the ability for users to comment, react to (e.g., "like"), and share content from the publishers' own website, in a manner set by the publisher. Companies like Facebook include feeds on their platform, which may display various advertising content, and which may display pictures and links to articles, along with content extensions, such as comments, reactions, and sharing.

However, Facebook is a closed, proprietary system, that limits the ability of users, publishers, and advertisers to control the method of display and the content and content extensions selected for display. Furthermore, neither the publishers, nor the third party content feed companies currently allow for a publisher-customized user experience for the feeds that appear at the bottom of various Web articles.

SUMMARY

Certain exemplary embodiments include a method of retrieving and displaying relevant content as part of a configurable feed in association with a web page hosted at a host server associated with a publisher. The method may include selecting a plurality of different content extensions having different content extension types to be displayed in association with the web page, wherein the web page is located at a particular URL, analyzing the web page for content to determine information about the web page, receiving a request for the URL of the web page, and based on the request and the analysis, selecting a plurality of content extension content corresponding respectively to the plurality of different content extensions and for display in a browser with the web page. The selection of the plurality of different content extensions is made at least in part by the publisher, and the selection of the content extension content is made at least in part by a third party content feed entity different from the publisher.

Certain exemplary embodiments include a method of retrieving and displaying links to a plurality of destination feed locations along with content extensions associated with those destination feed locations as part of a configurable feed displayed within a web page hosted at a host server associated with a publisher. The method may include selecting from a plurality of content extensions having different content extension types, at least a first content extension to be displayed in the web page next to a first link to a first destination feed location. The method may further include selecting from the plurality of content extensions, at least a second content extension to be displayed in the web page next to a second link to a second destination feed location. The second content extension may have a different content extension type from the first content extension. The method may additionally include analyzing the web page for content to determine information about the web page, and include receiving a request for the web page and based on the selections, the request, and the analysis, selecting first and second content extension content corresponding respectively to the first and second different content extensions and for display with the web page. The first content extension may be a reconfigured version of a first corresponding content extension included at the first destination feed location, and the second content extension may be a reconfigured version of a second corresponding content extension included at the second destination feed location.

Certain exemplary embodiments include a method of retrieving and displaying links to a plurality of destination feed locations along with content extensions associated with those destination feed locations as part of a configurable feed displayed within a web page hosted at a host server associated with a publisher. The method may include selecting from a plurality of content extensions having different content extension types, at least a first content extension to be displayed in the web page next to a first link to a first destination feed location, the first content extension having a first content extension type, and selecting from the plurality of content extensions, at least a second content extension to be displayed in the web page next to a second link to a second destination feed location, the second content extension having a second content extension type. The method may further include analyzing the web page for content to determine information about the web page, and may include receiving a request for the web page, and based on the selections, the request, and the analysis, selecting first and second content extension content corresponding respectively to the first and second content extensions and for display with the web page. The first content extension may include first content derived from a first corresponding content extension included at the first destination feed location, and the second content extension may include second content derived from a second corresponding content extension included at the second destination feed location.

BRIEF DESCRIPTION OF THE DRAWINGS

In the drawings, like numbers refer to like elements throughout.

FIG. 1 depicts an exemplary system and method for communicating various information in a network, according to certain embodiments;

FIG. 2A depicts an example of part of a publisher profile, according to certain example embodiments;

FIG. 2B depicts another example of part of a publisher profile, according to certain example embodiments.

DETAILED DESCRIPTION

Figure 3:
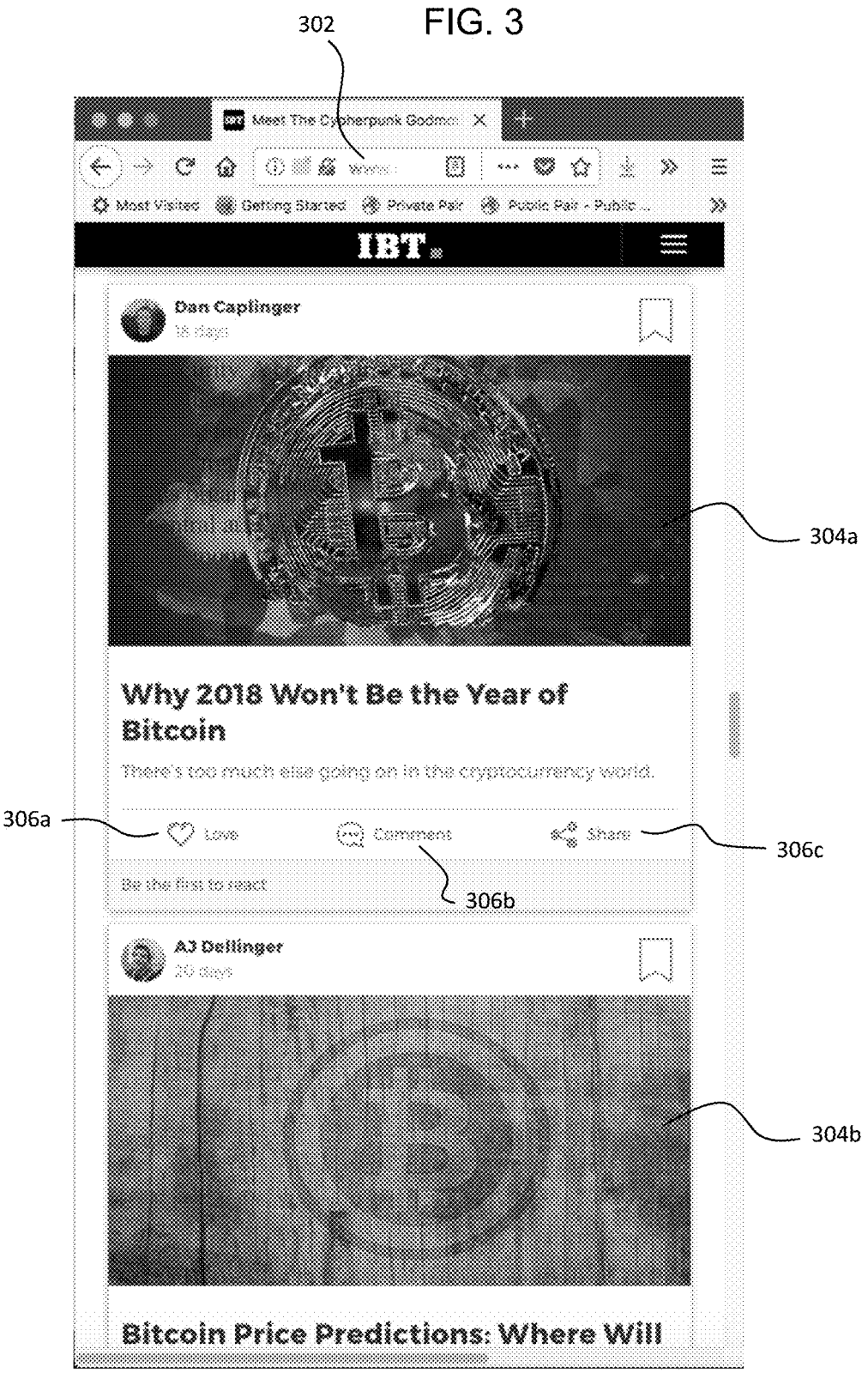
FIG. 3 depicts an example of a configurable feed including destination URL links and content extensions, according to certain example embodiments.

The present disclosure will now be described more fully with reference to the accompanying drawings, in which various embodiments are shown. The invention may, however, be embodied in many different forms and should not be construed as limited to the example embodiments set forth herein.

It will be understood that, although the terms first, second, third etc. may be used herein to describe various elements, systems, components, and/or steps, these elements, systems, components, and/or steps should not be limited by these terms. Unless the context indicates otherwise, these terms are only used to distinguish one element, system, component, and/or step from another element, component, system, and/or step, for example as a naming convention. Thus, a first element, system, component, and/or step discussed below in one section of the specification could be termed a second element, system, component, and/or step in another section of the specification or in the claims without departing from the teachings of the present disclosure. In addition, in certain cases, even if a term is not described using "first," "second," etc., in the specification, it may still be referred to as "first" or "second" in a claim in order to distinguish different claimed elements from each other.

It will be understood that when an element is referred to as being "connected" or "coupled" to another element, it can be directly connected or coupled to or on the other element or intervening elements may be present. In contrast, when an element is referred to as being "directly connected" or "directly coupled" to another element, or in "direct communication" with another element, there are no intervening elements present. Other words used to describe the relationship between elements should be interpreted in a like fashion (e.g., "between" versus "directly between," "adjacent" versus "directly adjacent," etc.).

Terms such as "same," or "equal to," as used herein when referring to certain features do not necessarily mean exactly identical, but are intended to encompass nearly identical features, within acceptable variations that may occur, for example, due to minor time delays, functionality variations, or other minor variations. The term "substantially" may be used herein to reflect this meaning.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

As is traditional in the field of the disclosed technology, features and embodiments are described, and illustrated in the drawings in terms of functional blocks, units, and/or modules representing computers, such as servers and clients. Those skilled in the art will appreciate that these blocks, units, and/or modules (e.g., servers and clients) may be implemented by computers that include microprocessors, memory, input/output devices, networking hardware and software, and similar computer technology, and may be programmed using software (e.g., computer programs and code) to perform various functions discussed herein and may optionally be driven by firmware in addition to software.

Among other things, the present disclosure describes a unified feed, that includes different components like videos, comments, polling, and reactions, but pulls these different components from different sources/contributors/applications to unify the results across different platforms. In addition, the present disclosure describes allowing users to login to the feed service, to better customize the user feed experience, across various publishers.

Each publisher, such as the New York Times, Newsweek, etc., can sign up with a third party content feed company, who provides a framework, or layout for a content feed that will appear at the bottom of the publisher's web pages (e.g., at the bottom of articles associated with a URL). For example, as part of the web page, the publisher can include a piece of code, such as Javascript, that renders a feed provided by a third party content feed company.

Each URL that includes the Javascript will communicate with the third party content feed company's system (e.g., server system), which then keeps a record of the URL, and includes software that analyzes the URL for its content, such as text, headers, and images, in order to determine the context of the page, topics associated with the page, and other relevant information. The content feed associated with the URL will then depend in part on this analysis, by matching possible content for the feed to the information collected about the content of the URL. Software and algorithms for selecting content feed content (e.g., selecting a particular destination URL) based on analysis of a web page at a URL is known in the art, and includes, for example, hybrid recommender algorithms combining or testing between Content Based, User Personalization, Opinion Based, Collaborative filtering, Multi-criteria, and Trend Based algorithms.

The content feed layout will be set in part by the third party feed company, and in part by the publisher, for example, based on a publisher's preferences. In addition, the layout may be determined based on a user accessing the publisher's website.

For example, different items can appear in the content feed, such as links to videos (or videos themselves), links to further articles (e.g., on the same publisher's or on other publishers' websites, or other third party websites), advertisements, voting polls, surveys, comments, reactions, or sharing links. In some examples, the third party feed company can pull the content, as well as the application software for these components from external sites. For example, in some embodiments, URLs that may appear in the content feed are catalogued by the third party content feed company's system, after being analyzed for content, structure, headlines, etc., and ranked based on the analysis. In addition, the URLs may be analyzed for certain Javascript or similar code (e.g., widgets, or plugins), such as comment widgets, poll widgets, reaction widgets, etc. Results of the analysis (e.g., comments, polls, and reactions discovered based on the discovered widgets) may be stored in the third party content feed company's system. For example, certain comments (e.g., the most popular comment, or the top comment) may be stored along with the URL on the third party content feed company's server; current poll results may be retrieved and stored along with the URL on the third party content feed company's server; reaction information may be retrieved and stored with the URL on the third party content feed company's server, etc. In some embodiments, rather than analyzing the URLs to determine content extensions such as comments, reactions, and polls, the provider of the URLs (e.g., publisher website itself) can be integrated with the third party content feed company's content feed, for example, using various APIs, Javascript, or other code, to automatically integrate the content extensions created by the publisher with the third party content feed company's feed.

In some embodiments, content extension content that is discovered and associated with a particular URL can appear in the content feed next to the URL. For example, the content feed can be configured so that below or next to an image link to a URL (e.g., a publisher's article), certain content extension data are displayed, such as one or more comments, reaction icons, a poll, etc. This enhances the viewer's experience and can assist the viewer in selecting which links from the content feed to select. In addition, by aggregating the content extensions along with the links to the articles in the content feed, the viewer has a better idea of the content, quality, and relevance of the articles, and can have a better idea of which articles to select and not select. This has the effect of controlling, reducing, and better targeting network traffic, thereby improving network communications.

In some embodiments, in addition to users viewing content extensions in a content feed, the users can interact with the content extensions (e.g., can add comments, select a reaction, or take a poll) from the content feed, and can thus add his/her input to the content extensions. To accomplish this, certain extensions can be integrated between the third party content feed company's system and the systems of the publishers who offer the content and content extensions. Using reactions as an example, in some embodiments, the third party content feed company can provide a reaction system and interface by placing a Javascript code on each URL catalogued to be used in the content feed, that the publisher web page uses to link to the third party content feed company's reaction storage. At the same time, the third party content feed company can have its own app in its content feed itself that also communicates with the reaction storage. The app is integrated with the Javascript code, so that reactions made on the publisher's web page itself, as well as reactions made in the third party content feed company's content feed, can be logged in the third party content feed company's reaction storage and associated with the web page.

In this manner, the content feed system and method described herein provides an open feed, where different companies and publishers can use the feed service under a single uniform platform. When content extension information (e.g., comments, reactions, etc.) is updated at the publisher website, it can be automatically updated at the third party content feed company, and vice versa. This decreases the need for users to navigate to the particular publisher's website to view and update the content extension content. In certain embodiments, a particular monetization method can be used to ensure that traffic lost to different pages on the publisher's website is accounted for. That said, overall network traffic can be reduced to improve network performance.

It should be noted that in some embodiments, the content included in a feed as content extensions can be received from one of a variety of sources that provide the content extensions for a particular web page. For example, the publisher as well as a social media site, such as Facebook, may include content extensions connected to a particular URL, and the content extension content included in the content feed may include information received from both sources. In this manner, for each item in the content feed (e.g., comments, reactions, polling, etc.), the information associated with that item may be pulled from different Internet locations, thereby creating a unified service that supplies the different items in a single customizable platform.

In some embodiments, the content extensions associated with a particular URL can be selected for display in a browser as part of the feed for that URL based on various factors, such as user data, time of day, historical data about the content extension, etc. The customization and aggregation of the content feed not only improves the desired look, feel, and relevance of information for each user, but as discussed previously, it also improves network traffic and therefore improves the underlying technology involved in communicating and displaying the feed.

In some embodiments, the third party feed company, also referred to as the feed producer, may have a server system that can include, on a hardware computer-readable medium, data (e.g., in the form of a database, for example) and program code configured to store a template that indicates a framework and/or layout for a content feed. The program code may additionally store various algorithms for determining which content extensions and content to include for each URL access. These algorithms may be based in part on the feed producer's own rules and parameters, publisher preferences regarding what components to be included in the content feed, the content of the URL itself, and/or user information. Some parameters used for selecting which content to include in a content feed include whether to display headers and logos, whether to include video (whether the publisher's own video or syndicated video), and an amount of sponsored content in the feed versus the amount of internal articles (e.g., non-sponsored content) in the feed.

Algorithms used to select which content is displayed in each particular content extension or in each suggested link in the feed include, for example, momentum or trending information, such as a trending rank, a highest click-through rate in a given time period, or most increased (e.g., by percentage or absolute numerical count) click-through rate in a particular time period compared to a previous time period. In one embodiment, each component of the feed can be either an advertisement (e.g., which may directly result in revenue to the publisher), or content or user engagement link (e.g., which may result in indirect revenue and which may have an associated revenue per page view, or "RPM"). In certain embodiments, the publisher can login to the feed producer's service in order to customize its feed for particular websites. One exemplary customization allows the publisher to select a range between all advertisements, and all content/user engagement. Other additional, or alternative, customizations by the publisher include selecting which types of content extensions to include in its feed associated with its websites, editing the layout of the feed, such as number of columns, a header section, etc., and/or grouping components of the feed based on tag or category.

Various third party application ("app") developers can be associated with the feed producer's service. For example, different app developers that produce comment apps, polling apps, video player apps, reaction apps, or sharing apps may have web-accessible apps that can be called from the feed producer's servers, in order to provide the appropriate services. As such, if it is determined that content extensions of comments and reactions are to be included in a feed along with a video, the respective apps for the comments, reactions, and video may be accessed by the feed producer's server in order to integrate the apps into the feed producer's feed for a particular URL.

In some embodiments, no third party Javascript (third party in relation to the feed producer) is used for implementing the components of the feed. One or more APIs can be used by each component of a video feed to access the data to be retrieved for the component, and/or Javascript code produced by the feed producer can be included in certain URLs. For greater uniformity, these APIs and/or Javascript can be created and controlled by the feed producer.

II. Cross-Platform User Experience

In some embodiments, each user must log in to interact with the various content extensions. For example, a user who wishes to comment on content by using a comments content extension would be asked to log in prior to making comments. The user can use a login name of the publisher, or of a social media site (e.g., Facebook), as his/her login, in which case that login name is associated with that user and can be shared using an API. In this way, the user can login one time, and then so long as the user stays logged in, for any websites that the user visits that include the feed producer's content feed, the user will no longer need to log in, and information selected by the user can be stored in connection with the same user.

This allows for a better user experience across various publishers' websites. User's can be asked upon login whether they would like to remain logged in to the feed producer's service (e.g., using a radio button or other GUI selection mechanism). Alternatively, no such option would be presented to the user, and the user can remain logged in, for example, as long as the user remains logged in to the publisher website or social media site used to login, or for a certain period of time after which an auto-log out occurs.

This login process additionally improves and speeds up a user's access to relevant data across various websites and platforms, so that regardless of what web site is being visited, the user will be presented with the most relevant content in the feeds at the bottom of Web articles. Thus, this has the technical improvement of allowing for providing the user with faster and more relevant access to various sites, for example, related to online shopping, political activism, medical needs, and a host of other important types of information, thus improving the technology of e-commerce itself.

FIG. 1 shows examples of communication between a client, publisher, feed producer, and destination feed locations, as well as an example of the type of content and content extensions that may be included in a retrieved web page.

The client device 110 may be, for example, an end user device such as a mobile phone, tablet, laptop, or desktop computer. The client device 110 may include an application such as a web browser that allows users to access the Internet. Any known browser suitable for the device being used can be implemented (e.g., Google Chrome, Firefox, Safari, etc.).

The publisher host server 120 may be, for example, one or more server computers connected to the Internet that contain a particular publisher's web site—e.g., for a news organization, it may include all of the news organization's articles, videos, and interactive applications, as well as other information that the news organization makes available to the public. The client device 110 and publisher host server 120 may communicate via one or more known communication media, such as wireless/cellular, land-based coaxial cable, fiber optics, satellite, etc.

The feed entity server 130 may be one or more server computers connected to the Internet that run computer program code for aggregating information to be displayed in a feed that will be associated with and displayed with a publisher's web page. The feed entity server 130 may be operated by a feed producer different from the publisher.

The destination feed locations, represented by destination URLs (Uniform Resource Locators) 1-4 refer to respective locations, such as file locations within different server computers 141-144 connected to the Internet, and link to content stored on those server computers 141-144. Some of the destination URLs, though different from each other, may refer to content located at the same server computer. Nonetheless, each destination URL may be stored at the feed entity server 130 for selection for content feed content. In some embodiments, different destination URLs may be included in or referenced by one or more publisher profiles stored at the feed entity server 130, to be retrieved and used in different feeds. The feed entity server 130 may then select which destination URLs to use, as well as which content extensions to use in the content feed based on the publisher profile, among other things.

The servers described herein for storing content associated with different URLs may also include cache servers.

As used herein, a "feed" refers to a set of additional information displayed in association with a particular web page, the set of additional information including references to further content that may be selected by the viewer of the web page.

As an example data flow, a user at a client device 110 may make a URL request, for example, by entering the URL in a web browser, or by clicking a link on an existing web page. The URL request is sent to the publisher host server 120, and as a result, in one embodiment, HTML representing a web page, or a video, or other content (collectively referred to herein as primary content) stored at a location referenced by the URL is returned to the client device 110. In association with the primary content returned to the client device 110, and in one embodiment, included in the HTML returned to the client device 110 is code such as Javascript, that when executed by a browser at the client device 110 makes a call to feed entity server 130. The feed entity server 130 receives this call, also referred to as a request for feed content, and based on the publisher profile, user profile, database of stored destination URLs, various algorithms, and other information, selects both destination URL content and content extensions to be included in the feed to be displayed with the primary content requested by the client device 110. The destination URL content and content extension information is then sent to the client device 110 to be included for display in the client device 110 browser along with the primary content.

More specifically, as one example, if a user makes a request to retrieve a particular article (primary content) from nytimes.com (e.g., www.nytimes.com/article_1), the HTML for that article may include Javascript configured to access the feed entity server 130 to obtain destination URL content for the content feed as well as and content extension content for content extensions for the content feed. The destination URL content may include, for example, a headline from the destination feed location, one or more pictures from the destination feed location, and/or other summary information from the destination feed location. Upon receiving a call for destination URL content, the feed entity server 130 may access the publisher profile, as well as optionally a user profile, to determine the structure for the content feed to be displayed with the primary content.

As one example, the table shown in FIG. 2A depicts one set of information that can be stored in a publisher's profile. In this example, each publisher (Newsweek.com is shown as one example) can select different destination URLs whose content is to appear in the feed (e.g., abc.com, def.com, xyz.com, and jkl.com), and for each destination URL, can determine which types of content extensions (e.g., comments, reactions, or all content extensions found in the destination URL) should be displayed in the feed alongside a link to a web page or source location of the destination URL. However, this is only one example. In other embodiments, the publisher can select, for different content types for display in the feed, which content extensions to display for each content type, as shown in FIG. 2B. The publisher can also select which content types to show in the feed, and can select, for example, the number of links in the feed (e.g., 9), how many of them should be for a destination URL for content having a first content type (e.g., 3 links to articles), how many of them should have be for a destination URL for content having a second content type (e.g. 3 links to videos), etc. This selection can be combined with one or both of the publisher profile features described in FIGS. 2A and 2B.

As mentioned briefly above, a publisher can select an option to display all content extensions associated with certain destination URLs or certain content types, which is indicated in FIGS. 2A and 2B as "all found." For example, Javascript or other code can determine which types of content extensions are associated with a particular destination URL included in the feed, and can add those content extensions alongside the destination URL content in the feed. FIGS. 2A and 2B only show a few examples, and the tables shown in FIGS. 2A and 2B will inevitably include far more entries than shown in these example.

Other exemplary configurable publisher selections include allowing the publisher to select how many destination URLs (e.g., what percentage of the total or which specific ones within a particular layout of displayed destination URLs) linking to advertisements should be included in the feed, versus how many destination URLs linking to engagement content should be included in the feed; allowing the publisher to select how many destination URLs (e.g., what percentage of the total or which specific ones within a particular layout of displayed destination URLs) linking to internal content on the publisher's own website versus how many destination URLs linking to external content should be used; and allowing the publisher to select a layout for the content and content extensions to be displayed in the feed.

In one embodiment, some or all of the selections available to the publisher for configuring the feed can be initially selected through a configurations page that allows the publisher to set its feed preferences.

In some embodiments, a user can also sign up to have a profile with the feed producer, and can also set preferences regarding the feed. Some or all of the configurable selections described above in connection with the publisher profile can also be selected by a user and stored in a user profile. In this case, the feed producer can determine which preferences (e.g., user vs. publisher) take precedence over others. The user profile can include other information about the user, such as user page visit history, user interests, demographics, user behavior profile, etc. In addition, as mentioned previously, the user can login when browsing different publisher sites with a single login name used by the feed producer, so that the user profile can be used across various publisher sites to allow for a cross-platform, cross-publisher unified feed that is customized for the user.

The content for the content feed (e.g., located at the destination feed location indicated by a destination URL) may be selected by the feed entity server 130 based on analysis of the primary content (in real-time or in advance), analysis of the content of the various destination feed locations (in real-time or in advance), matching algorithms that retrieve relevant content based on analyzed content in the primary content, and publisher and user profiles, such as publisher preferences, user behavior and interests, etc. The content extensions for the content feed may also be selected by the feed entity server 130, for example, based on the publisher profile and/or a user profile.

In certain embodiments, as can be seen in FIG. 1, destination URLs may be associated with destination URL content (e.g., a video, news article, etc.), and one or more content extensions, such as comments, reactions, etc. In FIG. 1, destination URL 1 (e.g., linking to destination feed location 1) is associated with content 1 and extension 1. Extension 1 has a certain format and a certain type. For example, it may be a reactions-type content extension, and may display reactions using a certain set of symbols, such as ones that convey "like," "love," "funny," "sad," and "dislike." Destination URL 2 (e.g., linking to destination feed location 2) is associated with content 2 and extension 2. Extension 2 has a certain format and a certain type. For example, it may be a comments-type content extension, and may display comments using a certain format, such as one that only shows top-level comments as a default. Destination URL 3 (e.g., linking to destination feed location 3) is associated with content 3 and extension 3. Extension 3 has a certain format and a certain type. For example, it may be a comments-type content extension, and may display comments using a certain format. The format may be the same as the format of extension 2, or may be different. For example, the format may be one that shows top and second-tier-level comments as a default. Destination URL 4 (e.g., linking to destination feed location 4) is associated with content 4 and extension 4. Extension 4 has a certain format and a certain type. For example, it may be a reactions-type content extension, and may display reactions using a certain format, which may be the same as or different from the format of extension 1. For example, in one embodiment, the format may include a different set of symbols from the format of extension 1, and includes one or more additional symbols (e.g., for "surprise" or other emotions).

Based on the publisher profile, and optionally a user profile as well, certain content extensions will be included along with the feed content displayed with primary content for a web page at a user device. For example, as shown in FIG. 1, content 1 and content 2 have been selected for the content feed (which selections can be based on various criteria, such as publisher, profile, user profile, primary content and destination URL content analysis and matching algorithms, etc.). In addition, content extension 1 and content extension 3 have been selected for display with content 1, and content extension 4 and content extension 2 have been selected for display with content 2. In some embodiments, the format of the content extensions displayed with the content feed is different from the format of the content extensions as they exist in one or more of the destination feed locations. In these cases, the content extension content may be reconfigured for display with the destination URL content in the content feed.

In some embodiments, the formats of the content extensions associated with certain destination URLs are different from the formats of the content extensions associated with other destination URLs for the same type of content extensions, and so the feed entity server re-configures content for at least one of the content extensions for display in the content feed so that all of the content extensions of the same type displayed in the content feed have the same, uniform, format. Thus, at least some of the content extensions used in the content feed may be reconfigured versions of the content extensions included in the originating destination feed locations.

The format here can refer to a display layout, a type of information being displayed, or a manner of organizing data, as examples. In some embodiments, where the same software application may be used for both the destination URL and content feed content extensions, reformatting may not occur.

In some embodiments, the content for the content extensions to be displayed in the content feed matches the content for the content extensions (e.g., included with the destination feed location) from which it is derived. However, in some embodiments, for example, where the content extension of the destination feed location has a different format from the content extension of its associated content feed content extension, certain content may be different between these two content extensions. For example, if the destination feed location has a content extension that includes six reaction symbols, but the content feed is set up for only five reaction symbols, then the information included in the different content extensions is different.

FIG. 3 depicts an example of a configurable feed including destination URL links and content extensions, according to certain example embodiments. As can be seen in FIG. 3, the configurable feed shows the bottom of a web page at primary URL 302, including a plurality of destination URL links 304a and 304b, in the form of pictures accompanied by headlines and optionally a brief summary, and further includes content extensions 306a, 306b, and 306c associated with each destination URL link. In the example of FIG. 3, the content extensions include reactions, comments, and sharing.

Based on the above-described embodiments, users can more easily browse through the various content extensions in a content feed due to a uniformly formatted feed, and at the same time, the users can avoid the need to select the actual destination URLs in order to discover what others are saying or how others feel about the destination URLs. This can improve network performance by reducing unnecessary traffic, and can improve individual user device performance by using less bandwidth and performing less processing.

We claim:

1. A method of retrieving and displaying links to a plurality of destination feed locations along with content extensions associated with those destination feed locations as part of a configurable feed displayed within a web page hosted at a host server associated with a publisher, the method comprising:
   selecting from a plurality of content extensions having different content extension types, at least a first content extension to be displayed in the web page next to a first link to a first destination feed location;
   selecting from the plurality of content extensions, at least a second content extension to be displayed in the web page next to a second link to a second destination feed location, the second content extension having a different content extension type from the first content extension;
   analyzing the web page for content to determine information about the web page;
   receiving a request for the web page; and
   based on the selections, the request, and the analysis, selecting first and second content extension content corresponding respectively to the first and second content extensions and for display with the web page,
   wherein the first content extension is a reconfigured version of a first corresponding content extension included at the first destination feed location, and
   wherein the second content extension is a reconfigured version of a second corresponding content extension included at the second destination feed location;

the method further comprising:
   additionally selecting from the plurality of content extensions, at least a third content extension to be displayed in the web page next to the first link to the first destination feed location, the third content extension having the same content extension type as the second content extension;
   additionally selecting from the plurality of content extensions, at least a fourth content extension to be displayed in the web page next to the second link to the second destination feed location, the fourth content extension having the same content extension type as the first content extension; and
   based on the additional selections, the request, and the analysis, selecting third and fourth content extension content corresponding respectively to the third and fourth content extensions and for display with the web page,
   wherein the third content extension is a reconfigured version of a third corresponding content extension included at the first destination feed location, and
   wherein the fourth content extension is a reconfigured version of a fourth corresponding content extension included at the second destination feed location.

2. The method of claim 1, further comprising:
   displaying on the web page (1) publisher content of the web page itself, and (2) content extension content using the selected content extensions.

3. The method of claim 2, wherein:
   at least one piece of the content extension content displayed on the web page is retrieved from a location outside the host server.

4. The method of claim 3, wherein:
   the selection of the content extension content is made at least in part by the publisher based on a stored publisher profile.

5. The method of claim 4, wherein:
   the publisher selects between advertising content and user engagement content to appear as the content extension content.

6. The method of claim 1, further comprising:
   storing user data including user ids for a plurality of users;
   logging a user into a third party content feed entity; and
   selecting content extension data for the selected content extensions based at least in part on a user id of a user making a request for the web page.

7. The method of claim 6, further comprising:
   receiving user input for a logged in user at one of the selected content extensions; and
   updating data for at least one of the selected content extensions based on the received user input.

8. The method of claim 1, further comprising:
   selecting content extension content for the content extensions based at least on an analysis of the content of the web page.

9. The method of claim 1, wherein:
   the web page includes javascript code used to obtain the plurality of selected content extensions and the content extension content.

10. The method of claim 1, wherein:
   the plurality of selected content extensions include at least two selected from the following: a comment extension; a reaction extension; a video extension; and a poll extension.

11. The method of claim 1, further comprising:
   storing a list of content URLs at a server of a third party content feed entity, each of those content URLs being a location for a content extension content; and retrieving one of the content URLs as one of the destination feed locations based on the analysis.

12. The method of claim 1, further comprising:
storing a user profile and publisher profile at a server of a third party content feed entity, and selecting from the plurality of content extensions based on both the user profile and the publisher profile.

13. The method of claim 1, wherein:
at least two of the selected content extensions are from different entities.

14. The method of claim 1, wherein:
the first content extension has a different display format from the first corresponding content extension included at the first destination feed location, and
the second content extension has a different display format from the second corresponding content extension included at the second destination feed location.

15. The method of claim 1, wherein:
the first corresponding content extension included at the first destination feed location has a different display format from the fourth corresponding content extension included at the second destination feed location even though they have the same content extension type; and
the first content extension has the same display format as the fourth content extension.

16. The method of claim 15, wherein:
the second corresponding content extension included at the second destination feed location has a different display format from the third corresponding content extension included at the first destination feed location even though they have the same content extension type; and
the second content extension has the same display format as the third content extension.

17. The method of claim 1, wherein:
the display format of the first content extension and fourth content extension is different from at least one of the display format of the first corresponding content extension and the display format of the fourth corresponding content extension.

18. The method of claim 17, wherein:
the display format of the first content extension and fourth content extension is different from both the display format of the first corresponding content extension and the display format of the fourth corresponding content extension.

19. The method of claim 1, wherein:
the first and fourth content extensions are reaction extensions.

20. The method of claim 19, wherein:
the second and third content extensions are comment extensions.

21. The method of claim 1, wherein:
selecting the first content extension and the second content extension are based on a publisher profile that indicates which content extensions the publisher selects to be displayed for different destination feed locations.

22. A method of retrieving and displaying links to a plurality of destination feed locations along with content extensions associated with those destination feed locations as part of a configurable feed displayed within a web page hosted at a host server associated with a publisher, the method comprising:

selecting from a plurality of content extensions having different content extension types, at least a first content extension to be displayed in the web page next to a first link to a first destination feed location, the first content extension having a first content extension type;
selecting from the plurality of content extensions, at least a second content extension to be displayed in the web page next to a second link to a second destination feed location, the second content extension having a second content extension type different from the first content extension type;
analyzing the web page for content to determine information about the web page;
receiving a request for the web page; and
based on the selections, the request, and the analysis, selecting first and second content extension content corresponding respectively to the first and second content extensions and for display with the web page,
wherein the first content extension includes first content derived from a first corresponding content extension included at the first destination feed location, and
wherein the second content extension includes second content derived from a second corresponding content extension included at the second destination feed location,
the method further comprising:
additionally selecting from the plurality of content extensions, at least a third content extension to be displayed in the web page next to the first link to the first destination feed location, the third content extension having the same content extension type as the second content extension;
additionally selecting from the plurality of content extensions, at least a fourth content extension to be displayed in the web page next to the second link to the second destination feed location, the fourth content extension having the same content extension type as the first content extension; and
based on the additional selections, the request, and the analysis, selecting third and fourth content extension content corresponding respectively to the third and fourth content extensions and for display with the web page.

23. The method of claim 22, wherein:
the first content extension and first corresponding content extension are reaction extensions.

24. The method of claim 23, wherein:
the second content extension and second corresponding content extension are comment extensions.

25. The method of claim 22, wherein:
the first content extension has a different format from the first corresponding content extension.

26. The method of claim 22, wherein:
the first content extension has the same format as the first corresponding content extension.

27. The method of claim 22, wherein:
selecting the first content extension and the second content extension are based on a publisher profile that indicates which content extensions the publisher selects to be displayed for different destination feed locations.

* * * * *